(12) United States Patent
Kashihara et al.

(10) Patent No.: US 10,818,439 B2
(45) Date of Patent: Oct. 27, 2020

(54) SOLID ELECTROLYTE CAPACITOR AND METHOD FOR MANUFACTURING SAME

(71) Applicant: Panasonic Intellectual Property Management Co., Ltd., Osaka (JP)

(72) Inventors: Masanori Kashihara, Saga (JP); Yumiko Oshima, Osaka (JP); Atsushi Kato, Saga (JP); Kazuhiro Murakami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/270,329

(22) Filed: Feb. 7, 2019

(65) Prior Publication Data

US 2019/0189361 A1 Jun. 20, 2019

Related U.S. Application Data

(63) Continuation of application No. PCT/JP2017/030021, filed on Aug. 23, 2017.

(30) Foreign Application Priority Data

Aug. 31, 2016 (JP) .................................. 2016-170241

(51) Int. Cl.
*H01G 9/15* (2006.01)
*H01G 9/00* (2006.01)
(Continued)

(52) U.S. Cl.
CPC ................ *H01G 9/15* (2013.01); *H01G 9/00* (2013.01); *H01G 9/012* (2013.01); *H01G 9/04* (2013.01);
(Continued)

(58) Field of Classification Search
CPC ............ H01G 9/15; H01G 9/00; H01G 9/012; H01G 9/04; H01G 9/07; H01G 9/08
See application file for complete search history.

(56) References Cited

U.S. PATENT DOCUMENTS

2006/0221553 A1* 10/2006 Ihara ...................... H01G 9/012
361/523
2014/0036417 A1* 2/2014 Fujimoto ............... H01G 9/055
361/532

FOREIGN PATENT DOCUMENTS

JP 61-156805 7/1986
JP 2003-133176 5/2003
(Continued)

OTHER PUBLICATIONS

International Search Report of PCT application No. PCT/JP2017/030021 dated Nov. 21, 2017.

*Primary Examiner* — Seahvosh Nikmanesh
(74) *Attorney, Agent, or Firm* — McDermott Will & Emery LLP (57) ABSTRACT

A method for manufacturing a solid electrolyte capacitor, the method including: preparing a connection body including a frame and a plurality of capacitor elements, the frame including a plurality of element connection units and a coupling portion that integrally couples the plurality of element connection units with each other, the plurality of element connection units being provided along a first direction and a second direction intersecting with first direction the plurality of capacitor elements being connected to the plurality of element connection units; sealing the plurality of capacitor elements by using a sealing resin having a stripe shape that extends in the first direction; forming a groove in the sealing resin by running a blade along the second direction between the capacitor elements adjacent in the first direction; and segmenting the plurality of capacitor elements by cutting the sealing resin along a bottom surface of the groove by laser and cutting a boundary between each of the plurality of element connection units and the coupling portion by laser.

4 Claims, 8 Drawing Sheets

(51) Int. Cl.
  *H01G 9/08* (2006.01)
  *H01G 9/012* (2006.01)
  *H01G 9/04* (2006.01)
  *H01G 9/07* (2006.01)

(52) U.S. Cl.
  CPC ................. *H01G 9/07* (2013.01); *H01G 9/08* (2013.01); *H01G 2009/0014* (2013.01)

(56) References Cited

FOREIGN PATENT DOCUMENTS

| | | |
|---|---|---|
| JP | 2005-347503 | 12/2005 |
| JP | 20006-319113 | 11/2006 |

\* cited by examiner

SOLID ELECTROLYTE CAPACITOR AND METHOD FOR MANUFACTURING SAME

RELATED APPLICATIONS

This application is a continuation of the PCT International Application No. PCT/JP2017/030021 filed on Aug. 23, 2017, which claims the benefit of foreign priority of Japanese patent application No. 2016-170241 filed on Aug. 31, 2016, the contents all of which are incorporated herein by reference.

BACKGROUND

1. Technical Field

The present disclosure relates to a solid electrolyte capacitor and a method for manufacturing the solid electrolyte capacitor.

2. Description of the Related Art

In manufacturing process of a solid electrolyte capacitor having a chip shape, after a frame in which a plurality of capacitor elements are arranged is covered with a sealing resin to form an aggregate including a plurality of solid electrolyte capacitors, the aggregate is segmented in each capacitor element. A frame constituting the aggregate is a two-dimensional sheet including a plurality of element connection units provided into a matrix shape, and an anode unit and a cathode unit of the capacitor element are electrically connected to each element connection unit.

Figure 9:
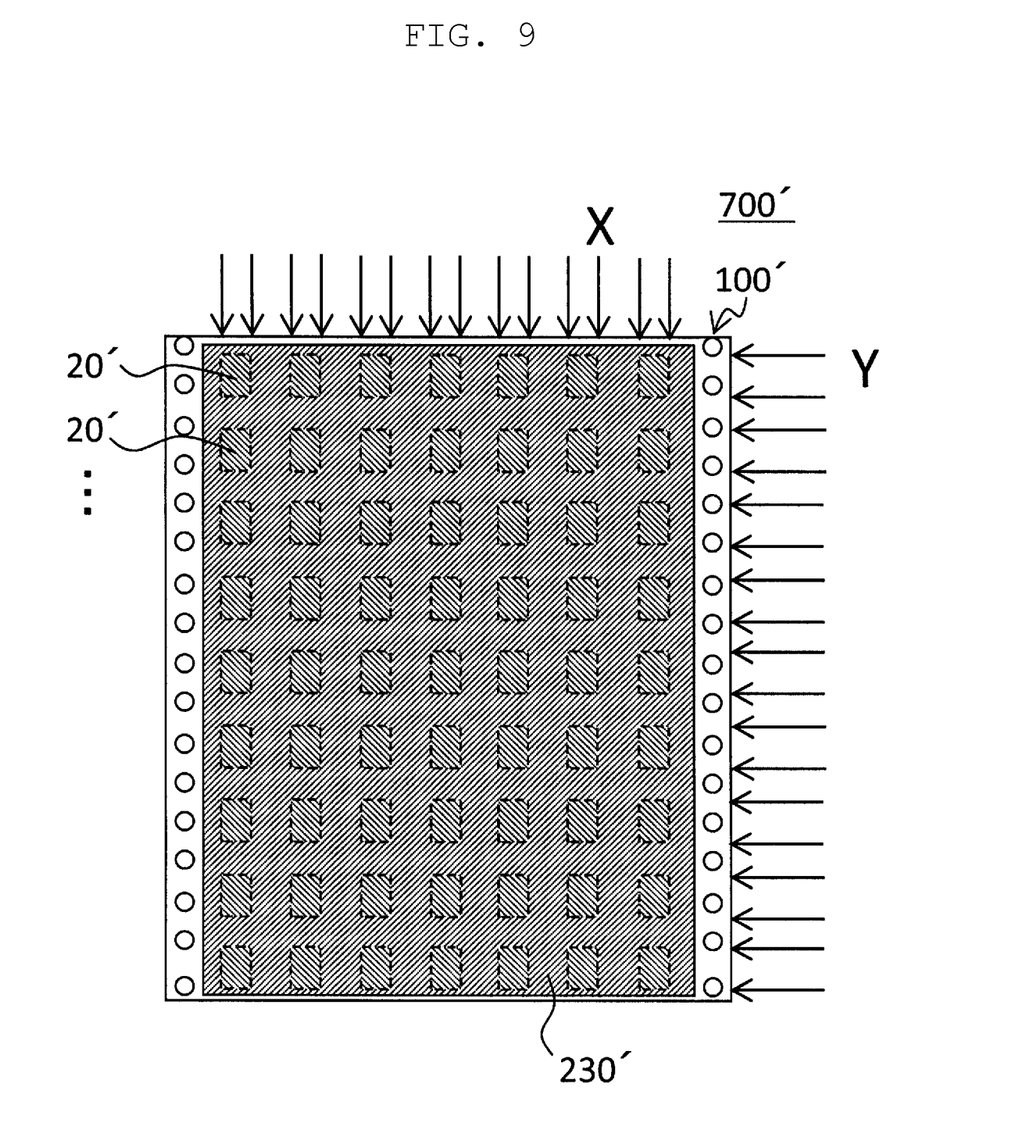
FIG. 9 is a plan view illustrating a conventional solid electrolyte capacitor aggregate in which the capacitor elements are sealed such that a substantially whole surface on one side of the frame is covered with a sealing resin.

Typically the sealing resin covers the plurality of capacitor elements and the frame so as to cover a substantially whole surface on one side of the two-dimensional sheet. FIG. 9 is a plan view illustrating conventional solid electrolyte capacitor aggregate 700 in which the capacitor elements are sealed such that a substantially whole surface on one side of frame 100' is covered with sealing resin 230'. For aggregate 700 having a matrix shape in FIG. 9, it is necessary to run a blade lengthwise and breadthwise in directions of arrows X and Y and to cut sealing resin 230' together with frame 100' to segment solid electrolyte capacitor 20' (for example, see Unexamined Japanese Patent Publication No. 2003-133176, Second Example).

SUMMARY

According to one aspect of the present disclosure, a method for manufacturing a solid electrolyte capacitor, the method includes: preparing a connection body including a frame having a sheet shape and a plurality of capacitor elements, the frame including a plurality of element connection units and a coupling portion that integrally couples the plurality of element connection units with each other, the plurality of element connection units being provided into a matrix shape along a first direction and a second direction intersecting with the first direction, the plurality of capacitor elements being respectively connected to the plurality of element connection units; sealing the plurality of capacitor elements included in the connection body by using a sealing resin, the sealing resin having a stripe shape extends in the first direction; forming a groove in the sealing resin by running a blade along the second direction between capacitor elements adjacent in the first direction among the plurality of capacitor elements to perform dicing of the sealing resin; and segmenting the plurality of capacitor elements sealed in the sealing resin by cutting the sealing resin along a bottom surface of the groove by laser and cutting a boundary between each of the plurality of element connection units and the coupling portion by laser.

According to another aspect of the present disclosure, a solid electrolyte capacitor includes: a capacitor element includes an anode body, a dielectric layer disposed on the anode body, and a cathode unit disposed on the dielectric layer; an anode terminal electrically connected to the anode body; a cathode terminal electrically connected to the cathode unit; and a sealing resin covering the capacitor element so as to expose at least a part of the anode terminal and at least a part of the cathode terminal. The sealing resin has a hexahedron shape having six principal surfaces. One principal surface among the six principal surfaces is a mounting surface. A pair of principal surfaces each of which has a side shared by the mounting surface among the six principal surfaces are a first side surface and a second side surface, the first side surface and the second side surface being opposed to each other. The anode terminal and the cathode terminal are exposed in the first side surface and the second side surface, respectively. The mounting surface intersects the first side surface and the second side surface at an acute angle less than 90°, respectively. Another pair of principal surfaces each of which has a side shared by the mounting surface among the six principal surfaces are a third side surface and a fourth side surface, the third side surface and the fourth side surface being opposed to each other. The mounting surface is substantially orthogonal to the third side surface and the fourth side surface, respectively.

According to the present disclosure, the solid electrolyte capacitor having the good external appearance can efficiently be manufactured.

DETAILED DESCRIPTION OF EMBODIMENT

In the conventional solid electrolyte capacitor manufacturing method, since a process of running the blade lengthwise and breadthwise to segment the aggregate needs to change in running direction of the blade, manufacturing steps are increased and the process is complicated. Further, when the blade is used for cutting the frame, burrs are easily generated in a cutting surface of the frame, and the blade is likely to be exhausted.

It is considered that the burrs are hardly generated when laser is used for cutting the frame. However, since the frame is covered with the sealing resin having a thickness greater than or equal to that of the capacitor element, it is difficult to accurately perform the cutting by laser. Even if the sealing resin can be cut, a molten trace of the sealing resin remains in the cutting surface, and it is difficult to manufacture a product having a good external appearance. Further, there is a possibility that heat of laser is conducted to the capacitor element to damage the capacitor element when the sealing resin is cut by laser.

In view of the above problems, the present disclosure provides a method for efficiently manufacturing the solid electrolyte capacitor having a good external appearance. A method for manufacturing a solid electrolyte capacitor according to an exemplary embodiment of the present disclosure will be described below with reference to the drawings.

(i) Connection Body Preparing Process

The method for manufacturing the solid electrolyte capacitor, the method includes a process of preparing a connection body including a frame having a sheet shape and a plurality of capacitor elements. The frame includes a plurality of element connection units and a coupling portion that integrally couples the plurality of element connection units with each other. The plurality of element connection units are provided into a matrix shape along a first direction and a second direction intersecting with the first direction. The plurality of capacitor elements are respectively connected to the plurality of element connection units. The first direction and the second direction preferably intersect each other at 90°. However, the first direction and the second direction are not limited to this configuration. The first direction and the second direction may intersect at an angle ranging, for example, from 88° to 92°, inclusive.

Figure 1:
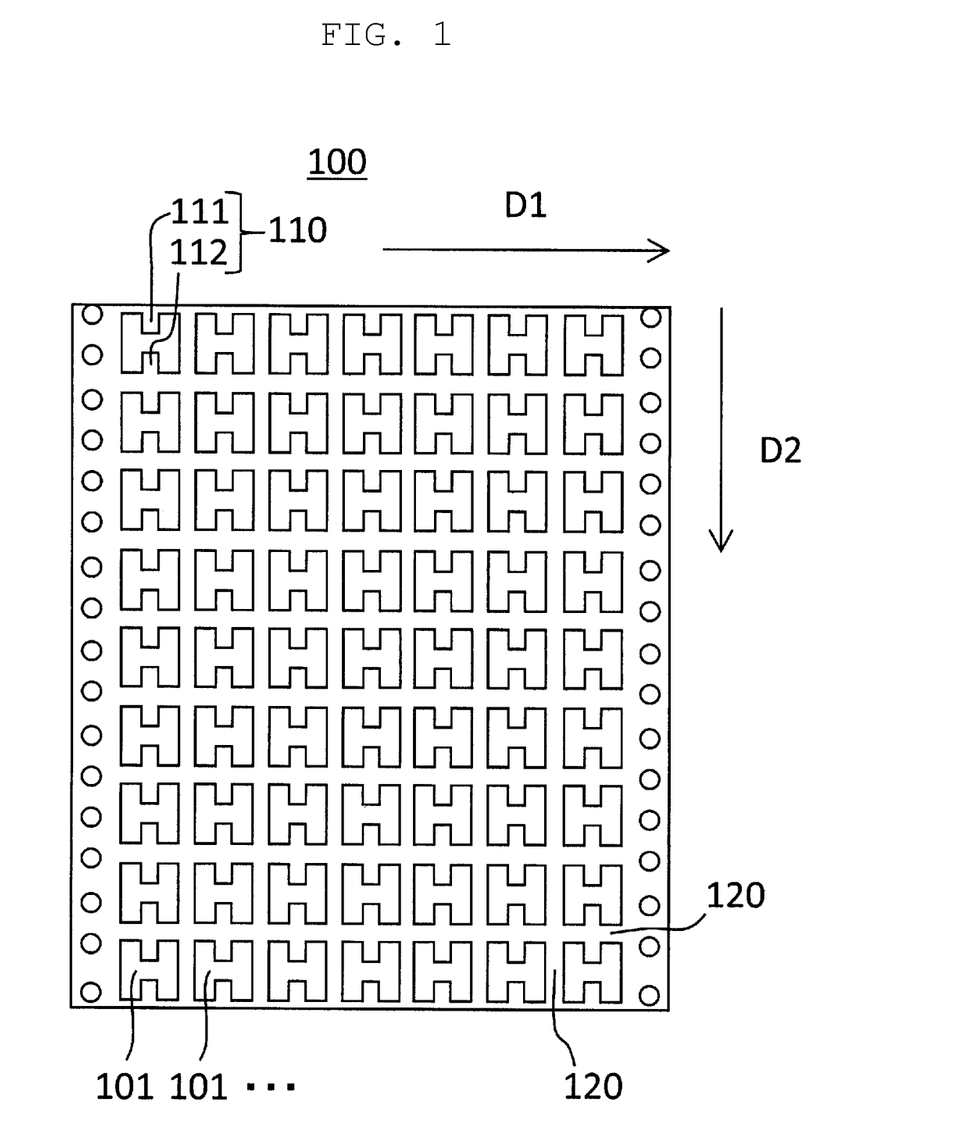
FIG. 1 is a plan view illustrating an example of a frame according to an exemplary embodiment of the present disclosure.

FIG. 1 is a plan view illustrating an example of a frame of the exemplary embodiment of the present disclosure. Frame 100 having a sheet shape includes a plurality of element connection units 110 provided into a matrix shape along a first direction (a direction of arrow D1) and a second direction (a direction of arrow D2), which intersect each other. And frame 100 further includes coupling portion 120 integrally coupling the plurality of element connection units 110. In frame 100, a portion except for element connection unit 110 can be regarded as coupling portion 120. In frame 100, a metal sheet or a metal foil is punched to form a plurality of H-shaped punching openings 101 into a matrix shape. A shape of the punching opening is not particularly limited, but may appropriately be changed according to a shape of the capacitor element or the like.

Figure 2:
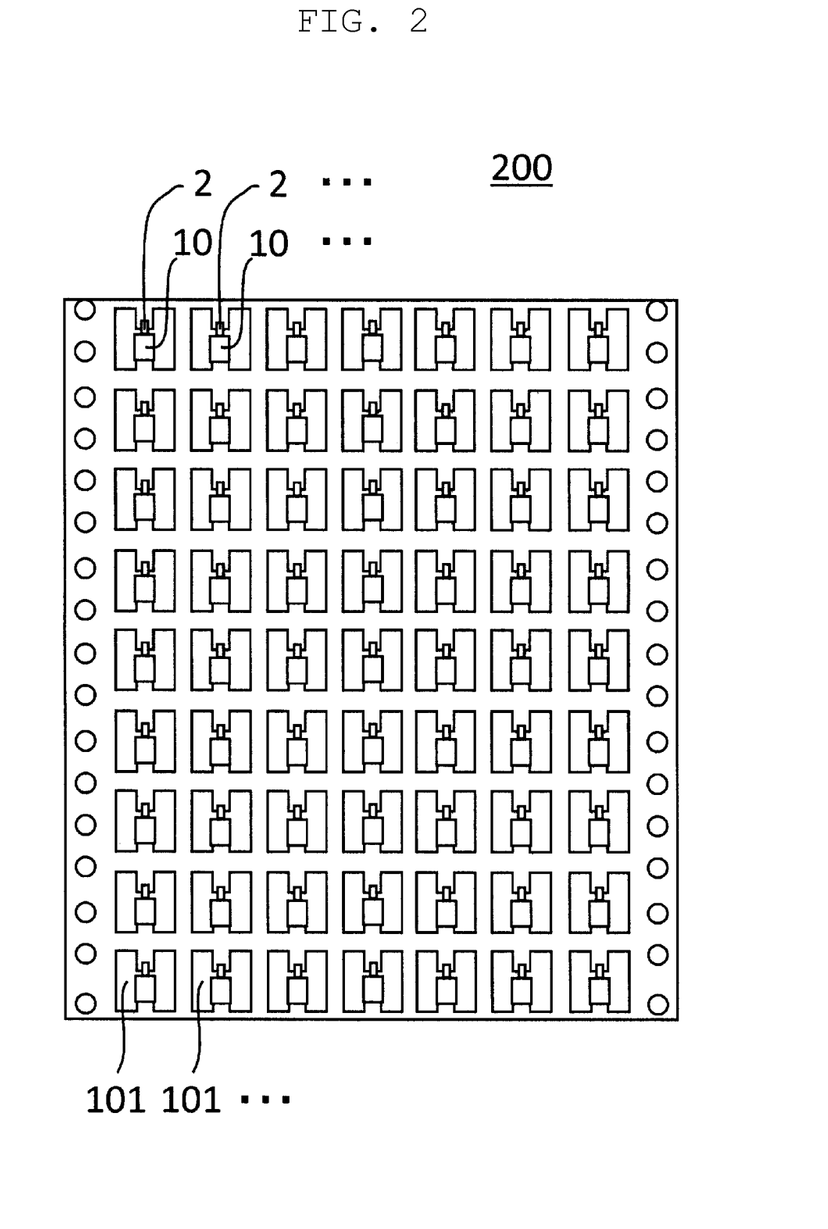
FIG. 2 is a plan view illustrating an example of a connection body including the frame and a capacitor element connected to an element connection unit of the frame.

Next, connection body 200 including frame 100 and a plurality of capacitor elements 10 is obtained by respectively connecting the plurality of capacitor elements 10 to the plurality of element connection units 110 included in frame 100. Each of the plurality of element connection units 110 includes anode terminal portion 111 and cathode terminal portion 112. FIG. 2 is a plan view illustrating connection body 200 when connection body 200 is viewed at a surface on which capacitor element 10 is disposed. Each capacitor element 10 includes an anode body having a substantially rectangular shape, a dielectric layer disposed on the anode body, and a cathode unit disposed on the dielectric layer. Anode lead 2 is provided in the anode body so as to stand erect. Anode lead 2 is electrically connected to one portion (anode terminal portion 111) of element connection unit 110. Anode lead 2 can be connected to anode terminal 111 with a predetermined pillow member interposed therebetween. Cathode unit is electrically connected to the other portion (cathode terminal portion 112) of element connection unit 110. Although a connection method is not particularly limited, joint by welding or adhesion using a conductive paste is preferably used.

(ii) Connection Body Sealing Process

Subsequently, a process of sealing the plurality of capacitor elements included in the connection body by using a sealing resin that extends into a stripe shape in the first direction is performed. That is, unlike the conventional method that the substantially whole surface on one side of the frame is covered with the sealing resin, the sealing resin having a stripe shape is provided so as to cover the plurality of solid electrolyte capacitors existing in the matrix shape in each row or column. Consequently, an amount of the used sealing resin can be reduced than before. Here, the sealing resin having a stripe shape may be provided so as to cover a boundary between the element connection unit and the coupling portion of the frame, or so as to expose the boundary. As for a molding of the sealing resin, for example, the sealing resin is molded by transfer molding. A thermosetting resin, which is cured during the transfer molding, is preferably used as the sealing resin.

Figure 3:
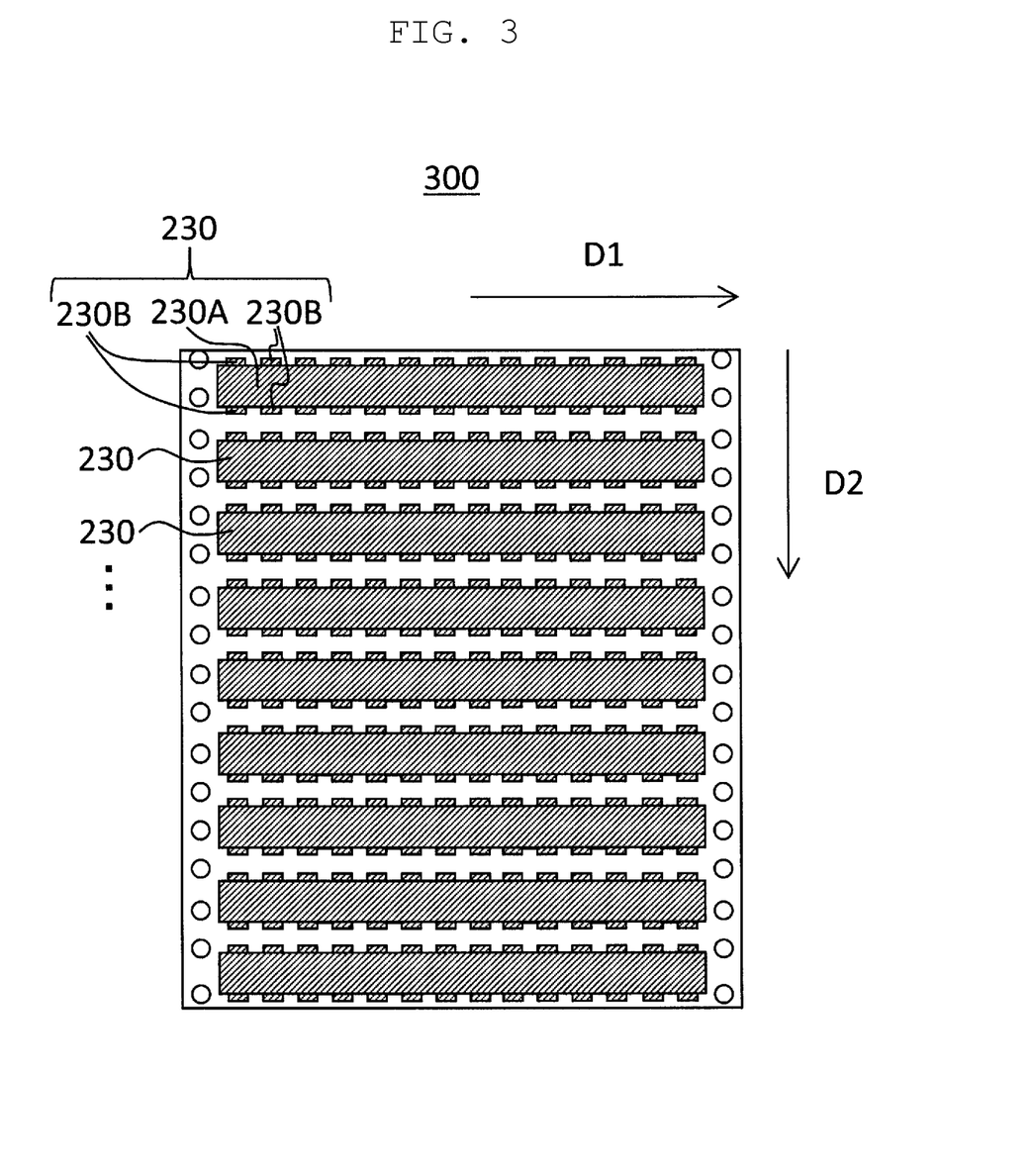
FIG. 3 is a plan view illustrating an example of a solid electrolyte capacitor aggregate obtained by sealing the capacitor elements of the connection body using a sealing resin having a stripe shape.

FIG. 3 is a plan view illustrating solid electrolyte capacitor aggregate 300 obtained by sealing capacitor elements 10 of connection body 200 using sealing resin 230 having a stripe shape. Sealing resin 230 accommodated in a cavity (recess) of a metal mold forms exterior unit 230A protecting capacitor element 10. On the other hand, a remaining sealing resin that is not accommodated in the cavity (recess) of the metal mold forms first thin plate portion 230B having a thickness similar to that of frame 100 so as to fill H-shaped punching opening 101.

When the frame having a sheet shape is a rectangle having a long side and a short side, the connection body, which includes the frame and the plurality of capacitor elements connected to the plurality of element connection units included in the frame, has the identical shape. That is, the shape of the connection body is decided by an outline of a periphery of the frame having a sheet shape.

When the connection body is the rectangle having the long side and the short side, preferably the first direction (that is, an extending direction of the sealing resin having a stripe shape) is substantially parallel to the short side of the connection body. In forming the sealing resin having a stripe shape by the transfer molding, a flow length of the sealing resin can be shortened by matching the first direction with a direction extending the short side of the connection body. Thus, flowability of the sealing resin is hardly interrupted, and all the capacitor elements arranged into the matrix shape are easily covered with the sealing resin.

As used herein, the term "rectangle" means a shape having a pair of the long sides and a pair of the short sides (the long side or the short side may include a curve line or a wavy line), each of which are substantially parallel to each other. And the term "substantially parallel" means that two directions form an angle ranging from 0° to 10° in the present disclosure.

In FIG. 3, the shape of frame 100 is rectangle including the short side in the first direction (the direction of arrow D1) and the long side in the second direction (the direction of arrow D2). Thus, in forming sealing resin 230 having a stripe shape by the transfer molding, a molten resin is desirably caused to flow along the first direction in the metal mold enclosing connection body 200. Consequently, sealing resin 230 having a stripe shape and extending in the first direction is formed. However, it is not necessary that the first direction in which the molten resin is caused to flow always correspond to the short-side direction of the frame, but the first direction in which the molten resin is caused to flow may correspond to the long-side direction of the frame.

(iii) Sealing Resin Cutting Process

Subsequently, a process of forming a groove in the sealing resin by running the blade along the second direction between the capacitor elements adjacent in the first direction to perform the dicing of the sealing resin is performed. Unlike the conventional method that the blade runs both lengthwise and breadthwise, but the blade runs only in one direction. Thus, it is not necessary to perform a process of changing the running direction of the blade. The blade runs over a region where the sealing resin exists and a region where the sealing resin does not exist one after another in one direction. The blade has only to perform the dicing of the sealing resin, but does not need to perform the dicing of the frame. Thus, the exhaustion of the blade is significantly suppressed as compared with the case that the blade is run lengthwise and breadthwise to cut both the sealing resin and the frame.

Figure 4:
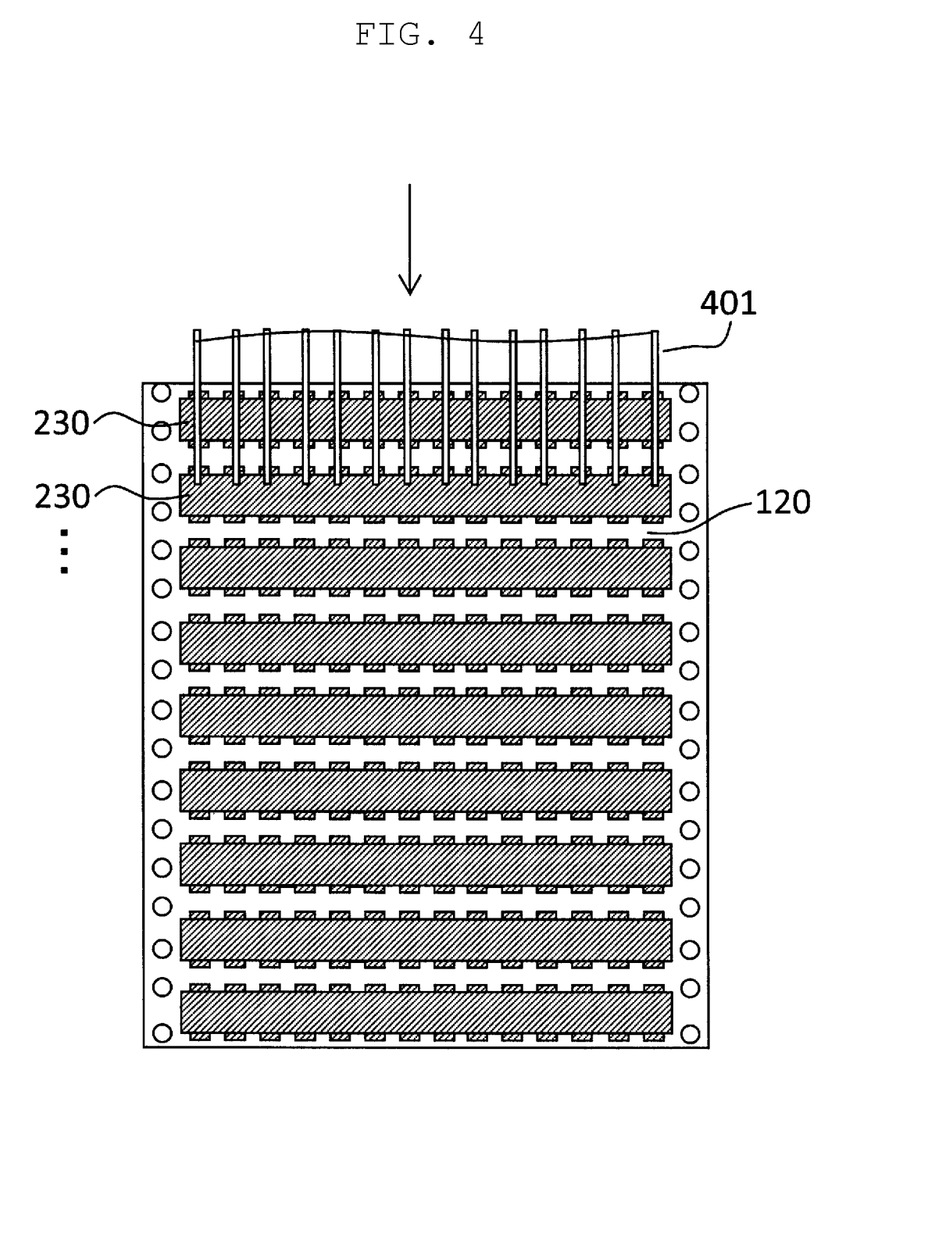
FIG. 4 is a plan view conceptually illustrating a state in which dicing of the sealing resin having a stripe shape is performed using a blade.
Figure 5:
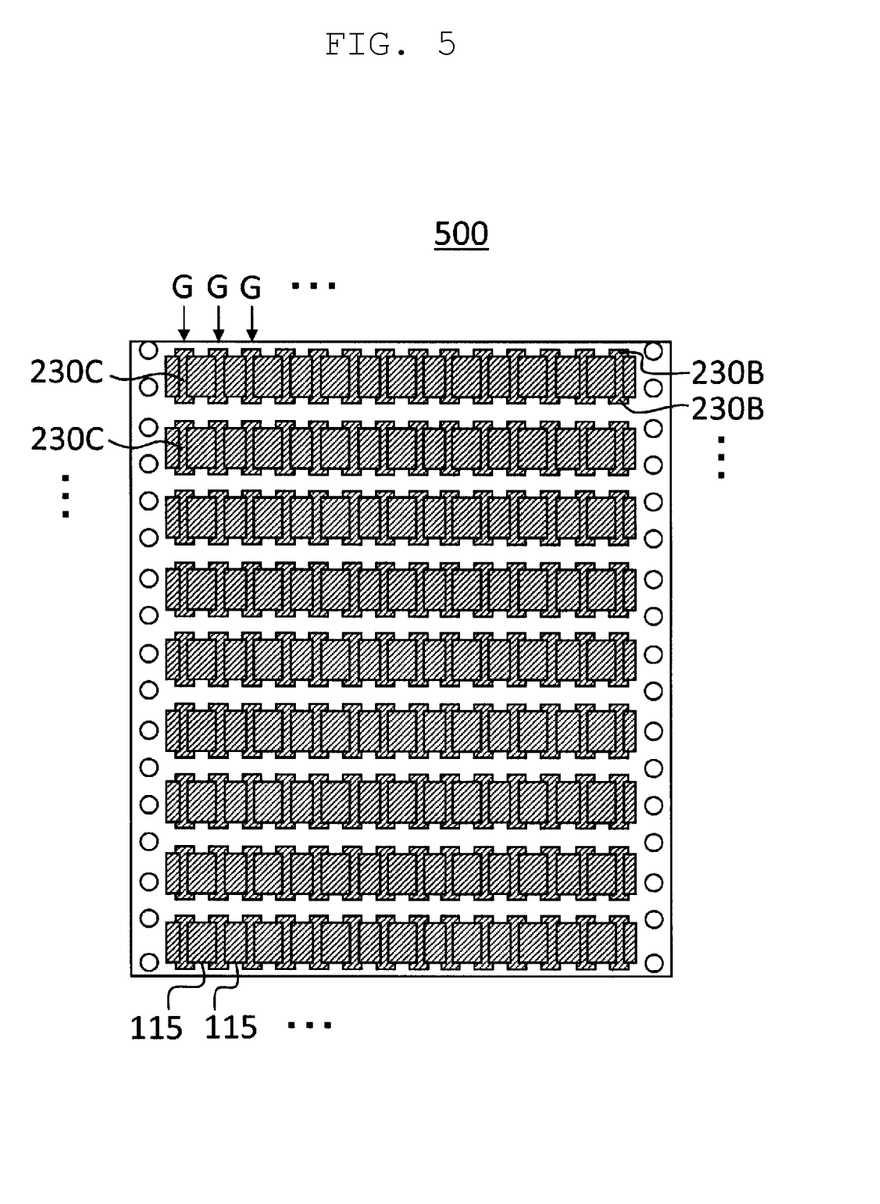
FIG. 5 is a plan view illustrating an example of the solid electrolyte capacitor aggregate in which the dicing of the sealing resin having a stripe shape has been performed, the solid electrolyte capacitor aggregate being in course of segmentation.

FIG. 4 is a plan view illustrating a state in which the dicing of sealing resin 230 is performed using blade 401. Consequently, as illustrated in FIG. 5, groove G is formed in sealing resin 230. FIG. 5 is a plan view illustrating solid electrolyte capacitor aggregate 500 when a process of the dicing of sealing resin 230 is ended (solid electrolyte capacitor aggregate 500 is in course of segmentation). Consequently, in sealing resin 230, second thin plate portion 230C is formed along a bottom surface of groove G.

At this point, preferably the bottom surface of groove G formed in sealing resin 230 and one of surfaces of frame 100 are substantially flush with each other. That is, in H-shaped punching opening 101, the dicing of sealing resin 230 is preferably performed so as to remain second thin plate portion 230C having the thickness substantially identical to that of frame 100. Consequently, second thin plate portion 230C is easily cut by laser, and the solid electrolyte capacitor having the excellent external appearance is further easy to obtain.

As used herein, the term "substantially flush" means that the thickness of the second thin plate portion in the punching opening is a thickness ranging from 95% to 105% of the thickness of frame 100.

In performing the dicing of sealing resin 230, preferably blade 401 and frame 100 are not brought into contact with each other. However, coupling portion 120 of frame 100 may partially be cut by using blade 401 to an extent that the exhaustion of blade 401 is not increased.

(iv) Segmentation Process

Subsequently, a process of segmenting the plurality of capacitor elements sealed by the sealing resin by cutting the sealing resin or the second thin plate portion by laser along the bottom surface of the groove formed in the sealing resin and cutting the boundary between the element connection unit and the coupling portion of the frame by laser is performed. More specifically, laser is scanned along the outline of the sealing resin of the solid electrolyte capacitor to be cut out. For aggregate 500 in FIG. 5, not only boundary 115 between second thin plate portion 230C and the frame but also first thin plate portion 230B of the sealing resin is cut by laser. That is, the sealing resin cut by laser is only the thin plate portion, so that the cutting can accurately be performed. The cutting surface of the thin plate portion by laser is not substantially disturbed, and there is no possibility of damaging the external appearance. Since the boundary between the element connection unit and the coupling portion of the frame is cut by laser, burrs are hardly generated.

Figure 6:
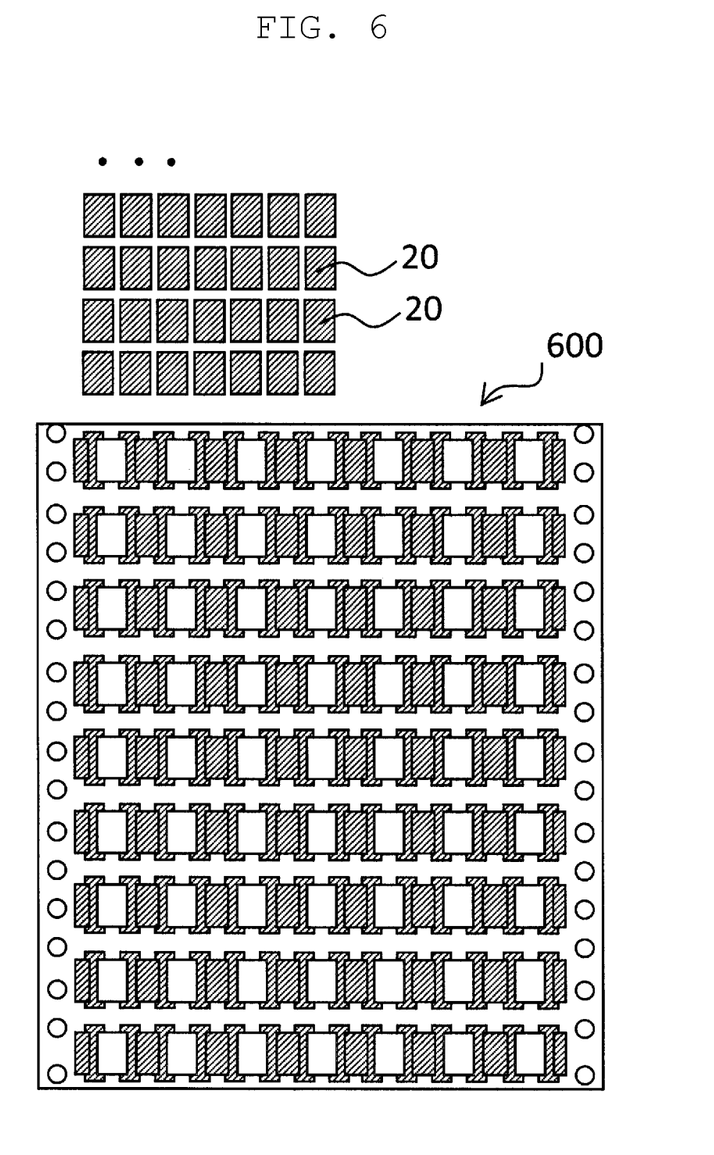
FIG. 6 is a plan view conceptually illustrating the solid electrolyte capacitor segmented by laser and a frame remainder after all the solid electrolyte capacitors are removed.

FIG. 6 is a plan view illustrating solid electrolyte capacitor 20 segmented by laser and frame remainder 600 after all solid electrolyte capacitors 20 are removed.

A structure of the solid electrolyte capacitor according to the exemplary embodiment of the present disclosure will be described below.

<Solid Electrolyte Capacitor>

The solid electrolyte capacitor includes the capacitor element including the anode body, the dielectric layer disposed on the anode body, and the cathode unit disposed on the dielectric layer. And the solid electrolyte capacitor further includes an anode terminal electrically connected to the anode body, a cathode terminal electrically connected to the cathode unit, and the sealing resin that covers the capacitor element so as to expose at least a part of the anode terminal and at least a part of the cathode terminal.

Figure 7:
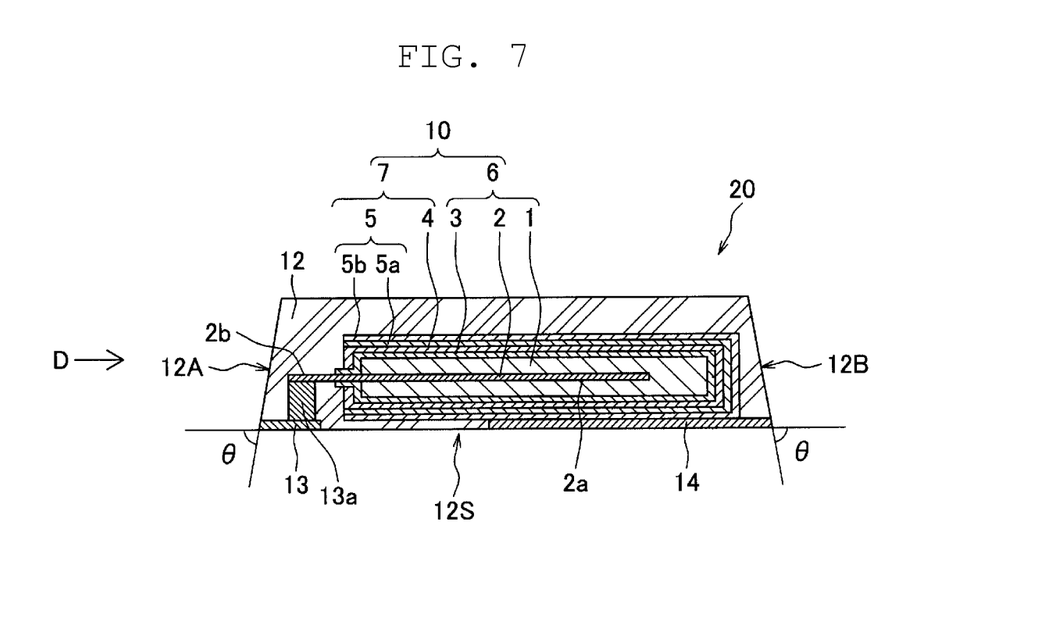
FIG. 7 is a sectional view schematically illustrating an example of the solid electrolyte capacitor according to the exemplary embodiment of the present disclosure.
Figure 8:
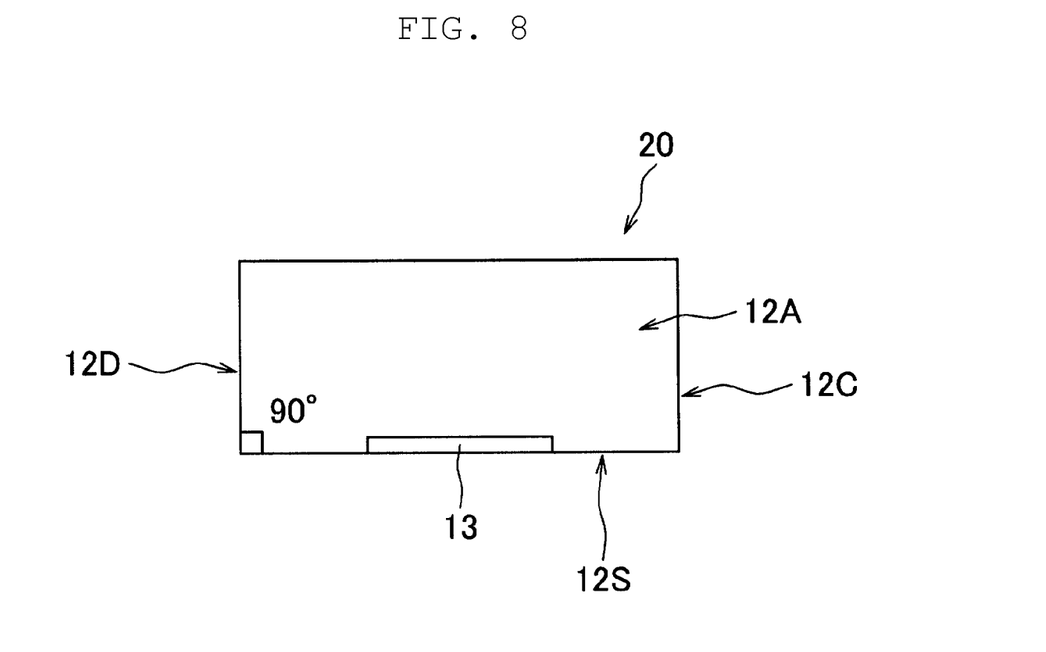
FIG. 8 is a front view illustrating the solid electrolyte capacitor in FIG. 7 when the solid electrolyte capacitor is viewed from direction D.

FIG. 7 is a sectional view schematically illustrating an example of the solid electrolyte capacitor, and FIG. 8 is a front view illustrating the solid electrolyte capacitor in FIG. 7 when the solid electrolyte capacitor is viewed from direction D. Solid electrolyte capacitor 20 includes capacitor element 10 including anode unit 6 and cathode unit 7, exterior body 12 that seals capacitor element 10. Solid electrolyte capacitor 20 further includes anode terminal 13 and cathode terminal 14. Anode terminal 13 is electrically connected to anode unit 6 and partially exposed from exterior body 12. Cathode terminal 14 is electrically connected to cathode unit 7 and partially exposed from exterior body 12.

Exterior body 12 is constituted by a portion cut out from exterior unit 230A of sealing resin 230. Anode terminal 13 is derived from anode terminal portion 111 of element connection unit 110 of frame 100. Cathode terminal 14 is derived from cathode terminal portion 112 of element connection unit 110.

<Anode Unit>

Anode unit 6 includes anode body 1 and anode lead 2. Anode lead 2 extends from a surface of anode body 1 and is electrically connected to anode terminal 13. For example, anode body 1 is a porous sintered body having a rectangular parallelepiped shape that is obtained by sintering metal particles. Particles of valve metal such as titanium (Ti), tantalum (Ta), and niobium (Nb) are used as the metal particles.

For example, anode lead 2 is constituted by a conductive wire. The above valve metals can also be used as a material for anode lead 2, but the material for anode lead 2 is not limited to the above valve metals. Anode lead 2 includes first portion 2a embedded in anode body 1 from a surface of anode body 1 and second portion 2b extending from the surface of anode body 1. Second portion 2b is connected to anode terminal 13 with pillow member 13a interposed therebetween.

<Dielectric Layer>

Dielectric layer 3 is formed on a surface of anode body 1. For example, dielectric layer 3 is made of metal oxide. For example, a method for immersing anode body 1 in an anodizing solution to anodize the surface of anode body 1 can be exemplified as a method for forming a metal-oxide-containing layer on the surface of anode body 1

<Cathode Unit>

Cathode unit 7 includes solid electrolyte layer 4 formed on dielectric layer 3 and cathode layer 5 covering solid electrolyte layer 4. Solid electrolyte layer 4 has only to be formed so as to cover at least a part of dielectric layer 3. Examples of solid electrolyte layer 4 include a manganese compound and a conductive polymer. Examples of the conductive polymer include polypyrrol, polyaniline, polythiophene, and derivatives thereof.

For example, cathode layer 5 includes carbon layer 5a that is formed so as to cover solid electrolyte layer 4 and metal paste layer 5b that is formed on a surface of carbon layer 5a. Carbon layer 5a contains conductive carbon material such as graphite and resin. For example, metal paste layer 5b contains a metal particle (for example, silver) and resin. Cathode layer 5 has only to have a current collecting function.

When the solid electrolyte capacitor has a chip shape, exterior body 12 derived from the sealing resin typically has a hexahedron shape having six principal surfaces. Here, one principal surface among the six principal surfaces is mounting surface 12S. Mounting surface 12S is a surface that is disposed to face a circuit member or a board when solid electrolyte capacitor 20 is mounted on the circuit member or the board. Among the six principal surfaces, a pair of principal surfaces each of which has a side shared by mounting surface 12S are first side surface 12A and second side surface 12B. First side surface 12A and second side surface 12B are opposed to each other. Anode terminal 13 and cathode terminal 14 are exposed in first side surface 12A and second side surface 12B, respectively. As described above, the exposed portions of anode terminal 13 and cathode terminal 14 are formed by cutting boundary 115 between element connection unit 110 and coupling portion 120 of frame 100 by laser.

In solid electrolyte capacitor 20 obtained by the method, mounting surface 12S intersects first side surface 12A and second side surface 12B, in which each terminal is exposed, at an acute angle $\theta$ less than 90° as illustrated in FIG. 7. First side surface 12A and second side surface 12B are the side surfaces that contact with the metal mold in forming sealing resin 230 having a stripe shape. Thus, the angle formed between first side surface 12A and mounting surface 12S and the angle formed between second side surface 12B and mounting surface 12S are decided by a metal mold shape designed in consideration of a mold release characteristic. In consideration of the mold release characteristic of sealing resin 230 having a stripe shape, a cross section perpendicular to a lengthwise direction (first direction) of sealing resin 230 having a stripe shape preferably has a trapezoid shape as shown in FIG. 7. That is, a bottom side corresponding to mounting surface 12S is longer than an upper side opposed to the bottom side. And the upper side and the bottom side are substantially parallel to each other. Thus, mounting surface 12S intersects first side surface 12A and second side surface 12B at the acute angle $\theta$ less than 90°, respectively. The acute angle $\theta$ is, for example, $80°\leq\theta<90°$, and preferably $80°\leq\theta<88°$.

Among the six principal surfaces, another pair of principal surfaces each of which has a side shared by the mounting surface are third side surface 12C and fourth side surface 12D. Third side surface 12C and fourth side surface 12D are opposed to each other. Mounting surface 12S is substantially orthogonal to third side surface 12C and fourth side surface 12D, respectively, as illustrated in FIG. 8. Third side surface 12C and fourth side surface 12D are the side surfaces that are formed when the dicing of sealing resin 230 is performed using the blade while second thin plate portion 230C is cut along the bottom surface of formed groove G by laser. Thus, third side surface 12C and fourth side surface 12D are formed so as to be substantially orthogonal to mounting surface 12S. Each of third side surface 12C and fourth side surface 12D has a molten trace by laser at an end close to mounting surface 12S.

The term "substantially orthogonal" means that an angle of 88° to 92° is formed by two surfaces.

In the method of the present disclosure, various types of solid electrolyte capacitors can efficiently be manufactured. Among others, the method of the present disclosure is suitable for a method for manufacturing a small and chip type of solid electrolyte capacitor.

What is claimed is:

1. A method for manufacturing a solid electrolyte capacitor, the method comprising:
    preparing a connection body including a frame having a sheet shape and a plurality of capacitor elements, the frame including a plurality of element connection units and a coupling portion that integrally couples the plurality of element connection units with each other, the plurality of element connection units being provided into a matrix shape along a first direction and a second direction intersecting with the first direction, the plurality of capacitor elements being respectively connected to the plurality of element connection units;
    sealing the plurality of capacitor elements included in the connection body by using a sealing resin, the sealing resin having a stripe shape that extends in the first direction;
    forming a groove in the sealing resin by running a blade along the second direction between capacitor elements adjacent in the first direction among the plurality of capacitor elements to perform dicing of the sealing resin; and
    segmenting the plurality of capacitor elements sealed in the sealing resin by cutting the sealing resin along a bottom surface of the groove by laser and cutting a boundary between each of the plurality of element connection units and the coupling portion by laser.

2. The method according to claim 1, wherein the bottom surface of the groove and one of surfaces of the frame are substantially flush with each other.

3. The method according to claim 1, wherein the connection body has a rectangular shape including a long side and a short side, and
    the short side is substantially parallel to the first direction.

4. The method according to claim 1, wherein each of the plurality of capacitor elements includes an anode body, a dielectric layer disposed on the anode body, and a cathode unit disposed on the dielectric layer, and
    each of the plurality of element connection units includes an anode terminal portion electrically connected to the anode body and a cathode terminal portion electrically connected to the cathode unit.

\* \* \* \* \*